US011413702B2

(12) United States Patent
Ladewig et al.

(10) Patent No.: US 11,413,702 B2
(45) Date of Patent: Aug. 16, 2022

(54) METHOD FOR ASCERTAINING A CONCENTRATION OF AT LEAST ONE MATERIAL IN A POWDER FOR AN ADDITIVE PRODUCTION METHOD

(71) Applicant: MTU Aero Engines AG, Munich (DE)

(72) Inventors: Alexander Ladewig, Bad Wiessee (DE); Andreas Jakimov, Fahrenzhausen (DE); Katrin Friedberger, Odelzhausen (DE)

(73) Assignee: MTU AERO ENGINES AG, Munich (DE)

( * ) Notice: Subject to any disclaimer, the term of this patent is extended or adjusted under 35 U.S.C. 154(b) by 1292 days.

(21) Appl. No.: 15/403,284

(22) Filed: Jan. 11, 2017

(65) Prior Publication Data

US 2017/0203387 A1 Jul. 20, 2017

(30) Foreign Application Priority Data

Jan. 14, 2016 (DE) .......................... 102016200324.0

(51) Int. Cl.
*B23K 26/03* (2006.01)
*B23K 15/00* (2006.01)
(Continued)

(52) U.S. Cl.
CPC .............. *B23K 26/032* (2013.01); *B22F 5/04* (2013.01); *B22F 12/00* (2021.01);
(Continued)

(58) Field of Classification Search
CPC ...... B28B 1/001; B23K 26/032; B23K 15/02; B23K 15/0086; B23K 26/342;
(Continued)

(56) References Cited

U.S. PATENT DOCUMENTS 4,882,249 A * 11/1989 Kitatani .................. C09B 35/50
430/56
5,427,733 A * 6/1995 Benda .................... B22F 3/1055
419/1
(Continued)

FOREIGN PATENT DOCUMENTS

EP 2832475 A2 2/2015
WO 2014074947 A9 5/2014
(Continued)

*Primary Examiner* — Eric S Stapleton
(74) *Attorney, Agent, or Firm* — Abel Schillinger, LLP

(57) ABSTRACT

A method for ascertaining the concentration of at least one material in a powder mixture used as starting material for the production of a component in an additive production method, comprising:
  providing the powder mixture having at least two different materials;
  guiding a high-energy beam generated by a radiation source over the surface of the powder mixture;
  detecting by a detection unit at least one brightness value of at least one subregion of the surface irradiated by the high-energy beam during the irradiation;
  ascertaining by an analysis unit the concentration of at least one material in the powder mixture depending on the detected at least one brightness value and at least one predetermined reference brightness value for a concentration and/or a concentration range of the material.

20 Claims, 1 Drawing Sheet

(51) Int. Cl.

| | |
|---|---|
| B23K 15/02 | (2006.01) |
| B23K 26/342 | (2014.01) |
| B28B 1/00 | (2006.01) |
| B33Y 10/00 | (2015.01) |
| B33Y 30/00 | (2015.01) |
| B33Y 50/02 | (2015.01) |
| B33Y 80/00 | (2015.01) |
| G01J 1/44 | (2006.01) |
| G01N 21/88 | (2006.01) |
| B22F 5/04 | (2006.01) |
| C04B 35/111 | (2006.01) |
| G01N 21/31 | (2006.01) |
| G01N 21/47 | (2006.01) |
| B22F 12/00 | (2021.01) |
| B23K 101/00 | (2006.01) |
| G01N 21/71 | (2006.01) |
| B22F 10/10 | (2021.01) |
| F01D 25/00 | (2006.01) |

(52) U.S. Cl.
CPC .......... *B23K 15/0086* (2013.01); *B23K 15/02* (2013.01); *B23K 26/342* (2015.10); *B28B 1/001* (2013.01); *B33Y 10/00* (2014.12); *B33Y 30/00* (2014.12); *B33Y 50/02* (2014.12); *B33Y 80/00* (2014.12); *C04B 35/111* (2013.01); *G01J 1/44* (2013.01); *G01N 21/31* (2013.01); *G01N 21/4738* (2013.01); *G01N 21/8806* (2013.01); *B22F 10/10* (2021.01); *B22F 2999/00* (2013.01); *B23K 2101/001* (2018.08); *C04B 2235/6026* (2013.01); *F01D 25/005* (2013.01); *F05D 2220/323* (2013.01); *F05D 2230/31* (2013.01); *G01J 2001/4406* (2013.01); *G01N 21/71* (2013.01); *G01N 2021/4769* (2013.01); *Y02P 10/25* (2015.11)

(58) Field of Classification Search
CPC .. B23K 2101/001; B33Y 80/00; B33Y 50/02; B33Y 30/00; B33Y 10/00; B22F 3/1055; B22F 5/04; B22F 2003/1056; B22F 2003/1057; B22F 2999/00; B22F 2203/00; B22F 2207/00; B22F 10/30; B22F 12/00; B22F 10/20; B22F 10/10; G01N 21/8806; G01N 21/31; G01N 21/4738; G01N 21/71; G01N 2021/4769; G01J 1/44; G01J 2001/4406; C04B 35/111; C04B 2235/6026; F05D 2220/323; F05D 2230/31; Y02P 10/295; Y02P 10/25; F01D 25/005
USPC ...................................... 219/76.1
See application file for complete search history.

(56) References Cited

U.S. PATENT DOCUMENTS

| | | | | |
|---|---|---|---|---|
| 5,460,945 A * | 10/1995 | Springer | ............ | A61M 1/3679 422/533 |
| 6,077,635 A * | 6/2000 | Okado | ................ | G03G 9/0819 430/108.6 |
| 6,361,930 B1 * | 3/2002 | Ishikawa | ............... | G03C 7/407 430/399 |
| 6,372,895 B1 * | 4/2002 | Bentsen | ............... | C07H 17/075 530/300 |
| 6,405,095 B1 * | 6/2002 | Jang | .................. | G05B 19/4099 700/118 |
| 6,580,959 B1 * | 6/2003 | Mazumder | ........ | G05B 19/4185 700/112 |
| 6,777,070 B1 * | 8/2004 | Murata | ................ | C08F 259/08 428/323 |
| 6,925,346 B1 * | 8/2005 | Mazumder | ........... | B23K 26/032 700/119 |
| 9,164,032 B2 * | 10/2015 | Islam | ...................... | G01J 3/453 |
| 9,522,426 B2 * | 12/2016 | Das | ........................ | B22F 3/1055 |
| 9,927,364 B1 * | 3/2018 | Chao | ...................... | G01N 21/65 |
| 2002/0057980 A1 * | 5/2002 | Morita | ................. | B22F 3/1025 419/6 |
| 2002/0182528 A1 * | 12/2002 | Nakanishi | ............... | G03G 9/081 430/137.2 |
| 2003/0035149 A1 * | 2/2003 | Ishikawa | ............... | G03C 8/4013 358/302 |
| 2003/0035917 A1 * | 2/2003 | Hyman | .................... | B41M 1/30 428/67 |
| 2003/0067594 A1 * | 4/2003 | Goodwin | ............... | G01N 15/04 356/73 |
| 2003/0108601 A1 * | 6/2003 | Chrai | .................... | A61K 9/0056 424/465 |
| 2003/0123909 A1 * | 7/2003 | Akashi | ............... | G03G 15/0928 399/286 |
| 2003/0181311 A1 * | 9/2003 | Tanaka | .................... | B32B 18/00 501/135 |
| 2003/0198903 A1 * | 10/2003 | Noguchi | .................. | G03C 7/30 430/503 |
| 2003/0207235 A1 * | 11/2003 | der Zel | ............... | A61C 13/0004 433/223 |
| 2003/0222366 A1 * | 12/2003 | Stangel | ............... | A61C 13/0004 264/16 |
| 2004/0038306 A1 * | 2/2004 | Agnew | .................. | G01N 33/50 435/7.1 |
| 2004/0094728 A1 * | 5/2004 | Herzog | ................. | B22F 3/1055 250/559.06 |
| 2004/0133298 A1 * | 7/2004 | Toyserkani | .......... | B23K 26/032 700/166 |
| 2004/0146615 A1 * | 7/2004 | McDonald | .......... | G01N 21/359 426/231 |
| 2004/0169874 A1 * | 9/2004 | Tone | ..................... | G03G 15/011 358/1.9 |
| 2004/0171034 A1 * | 9/2004 | Agnew | .................... | C12Q 1/42 435/6.11 |
| 2005/0014197 A1 * | 1/2005 | Agnew | ............... | G01N 33/5008 435/7.1 |
| 2005/0130316 A1 * | 6/2005 | Pezzotti | ............ | G01N 21/1717 436/171 |
| 2005/0133729 A1 * | 6/2005 | Woodworth | .......... | A61L 2/0011 250/455.11 |
| 2005/0191554 A1 * | 9/2005 | Soga | ..................... | B82Y 30/00 429/232 |
| 2005/0221184 A1 * | 10/2005 | Naruto | .................. | H01M 4/133 429/231.8 |
| 2005/0225752 A1 * | 10/2005 | Takai | ................. | G01N 21/4795 356/237.1 |
| 2005/0288813 A1 * | 12/2005 | Yang | ..................... | B22F 3/1055 700/119 |
| 2006/0019128 A1 * | 1/2006 | Tanaka | ..................... | G11B 5/70 428/840.3 |
| 2006/0072782 A1 * | 4/2006 | Abe | ....................... | G06T 1/0092 382/100 |
| 2006/0257760 A1 * | 11/2006 | Mori | ..................... | G03F 7/2041 430/7 |
| 2007/0049760 A1 * | 3/2007 | Kawakami | ............. | C09K 11/06 548/440 |
| 2007/0176312 A1 * | 8/2007 | Clark | .................... | B22F 3/1055 264/40.1 |
| 2007/0205184 A1 * | 9/2007 | Mazumder | ............... | B23H 9/00 219/69.17 |
| 2007/0248879 A1 * | 10/2007 | Durkot | ............... | H01M 2/0272 429/130 |
| 2008/0152938 A1 * | 6/2008 | Kelman | ................. | B22F 1/0022 428/546 |
| 2008/0319356 A1 * | 12/2008 | Cain | ................... | A61B 17/22004 601/2 |
| 2009/0016924 A1 * | 1/2009 | Allen | ...................... | H05K 3/02 419/9 |
| 2009/0134359 A1 * | 5/2009 | Watanabe | ............ | C09K 11/0838 252/301.6 F |

(56) References Cited

U.S. PATENT DOCUMENTS

| | | | | |
|---|---|---|---|---|
| 2009/0140205 A1* | 6/2009 | Kijima | C04B 35/581 | 252/301.6 R |
| 2009/0152771 A1* | 6/2009 | Philippi | B33Y 10/00 | 264/410 |
| 2009/0206065 A1* | 8/2009 | Kruth | B22F 3/1055 | 219/121.66 |
| 2010/0044547 A1* | 2/2010 | Higashi | B22F 3/003 | 249/79 |
| 2010/0074083 A1* | 3/2010 | Shibuya | C08K 5/34926 | 369/100 |
| 2010/0085728 A1* | 4/2010 | Seto | C09K 11/0883 | 362/84 |
| 2010/0140550 A1* | 6/2010 | Keller | B29C 39/025 | 252/301.4 S |
| 2010/0176539 A1* | 7/2010 | Higashi | B22F 3/1055 | 264/497 |
| 2011/0039016 A1* | 2/2011 | Beard | B33Y 30/00 | 427/8 |
| 2011/0061591 A1* | 3/2011 | Stecker | B22F 3/1055 | 118/663 |
| 2011/0064784 A1* | 3/2011 | Mullens | B22F 3/1121 | 424/443 |
| 2011/0212090 A1* | 9/2011 | Pedersen | A61K 39/0011 | 424/133.1 |
| 2011/0220621 A1* | 9/2011 | Pieger | B23K 26/043 | 219/121.6 |
| 2011/0313113 A1* | 12/2011 | Sakamoto | C08F 2/10 | 525/384 |
| 2012/0062208 A1* | 3/2012 | Ohshima | G03G 15/02 | 324/72 |
| 2012/0069339 A1* | 3/2012 | Toyoda | G01N 21/8806 | 356/432 |
| 2012/0070469 A1* | 3/2012 | Barenholz | A61K 9/1075 | 424/400 |
| 2012/0225767 A1* | 9/2012 | Imholt | B29D 11/00 | 501/1 |
| 2012/0256533 A1* | 10/2012 | Seto | C04B 35/58085 | 313/498 |
| 2012/0258851 A1* | 10/2012 | Nakatsuru | C08F 220/06 | 502/7 |
| 2013/0112672 A1* | 5/2013 | Keremes | B22F 3/1055 | 219/121.78 |
| 2013/0154160 A1* | 6/2013 | Cooper | B29C 64/135 | 264/401 |
| 2013/0168902 A1* | 7/2013 | Herzog | B22F 3/1055 | 264/401 |
| 2013/0270746 A1* | 10/2013 | Elsey | B29C 35/0805 | 264/447 |
| 2013/0338041 A1* | 12/2013 | Hamasaki | G01N 21/648 | 506/16 |
| 2014/0039451 A1* | 2/2014 | Bangera | G06F 17/5086 | 604/506 |
| 2014/0086976 A1* | 3/2014 | Szalay | C12N 7/00 | 424/445 |
| 2014/0105824 A1* | 4/2014 | Shepard | G01N 33/566 | 424/9.2 |
| 2014/0144895 A1* | 5/2014 | Stork | B23K 26/046 | 219/121.75 |
| 2014/0144936 A1* | 5/2014 | Mehus | A47L 15/449 | 222/58 |
| 2014/0163717 A1* | 6/2014 | Das | B22F 3/1055 | 700/119 |
| 2014/0312335 A1* | 10/2014 | Goto | H01L 51/0003 | 257/40 |
| 2014/0322729 A1* | 10/2014 | Fan | G01N 21/31 | 435/7.9 |
| 2014/0346094 A1* | 11/2014 | Nygaard | B07C 5/3422 | 209/579 |
| 2014/0347438 A1* | 11/2014 | Nygaard | G01N 21/952 | 348/36 |
| 2014/0349337 A1* | 11/2014 | Dasari | G01N 33/49 | 435/40.5 |
| 2015/0037601 A1* | 2/2015 | Blackmore | B23K 15/002 | 428/600 |
| 2015/0061170 A1* | 3/2015 | Engel | B33Y 10/00 | 264/40.1 |
| 2015/0129583 A1* | 5/2015 | Richter | B23K 26/0006 | 219/601 |
| 2015/0171234 A1* | 6/2015 | Ushinsky | H01L 27/1462 | 257/432 |
| 2015/0174658 A1* | 6/2015 | Ljungblad | B33Y 10/00 | 419/55 |
| 2015/0258626 A1* | 9/2015 | Seufzer | B23K 15/0086 | 219/121.15 |
| 2015/0273622 A1* | 10/2015 | Manabe | B23K 15/0086 | 219/76.1 |
| 2015/0283610 A1* | 10/2015 | Ljungblad | B22F 3/1055 | 419/55 |
| 2015/0283612 A1* | 10/2015 | Maeda | B22F 3/1055 | 425/78 |
| 2016/0179064 A1* | 6/2016 | Arthur | G05B 15/02 | 700/98 |
| 2016/0221262 A1* | 8/2016 | Das | G03F 7/70416 | |
| 2016/0236279 A1* | 8/2016 | Ashton | B22F 3/1055 | |
| 2017/0056975 A1* | 3/2017 | Carter | B22F 3/1055 | |
| 2017/0066051 A1* | 3/2017 | Ackelid | B33Y 10/00 | |

FOREIGN PATENT DOCUMENTS

| | | |
|---|---|---|
| WO | 2015040433 A2 | 3/2015 |
| WO | 2017036868 A1 | 3/2017 |

\* cited by examiner

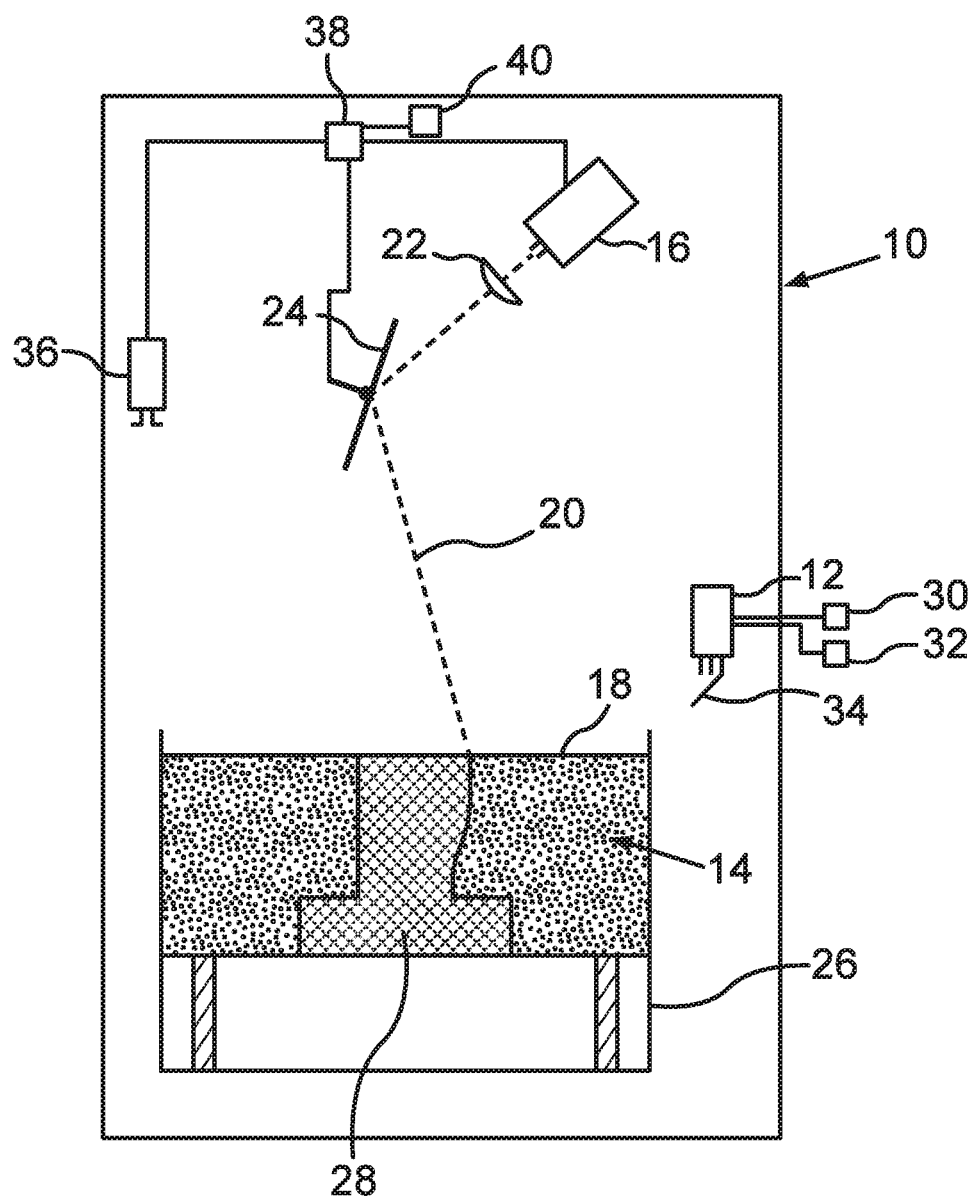

METHOD FOR ASCERTAINING A CONCENTRATION OF AT LEAST ONE MATERIAL IN A POWDER FOR AN ADDITIVE PRODUCTION METHOD

CROSS-REFERENCE TO RELATED APPLICATIONS

The present application claims priority under 35 U.S.C. § 119 of German Patent Application No. 102016200324.0, filed Jan. 14, 2016, the entire disclosure of which is expressly incorporated by reference herein.

BACKGROUND OF THE INVENTION

1. Field of the Invention

The invention relates to a method for ascertaining a concentration of at least one material in a powder, which is used as a starting material for the production of a component, in particular a component of a turbomachine, in an additive production method. Furthermore, the invention relates to a method for operating a manufacturing device for additive production of a component. In addition, the invention relates to a manufacturing device for additive production of a component and also a component for a turbomachine.

2. Discussion of Background Information

An additive production method for a component is known from US 2015/0061170 A1, the entire disclosure of which is incorporated by reference herein, in which a density and a temperature of a material layer are detected. The manufacturing of the component during the additive production is controlled depending on this detected density and/or this detected temperature.

An additive production method for jet engine components is known from WO 2014/074947 A9, the entire disclosure of which is incorporated by reference herein. The manufacturing device used in this case can be controlled depending on values detected by means of a thermal imaging camera.

An additive production method for a component is also known from US 2015/0273622 A1, the entire disclosure of which is incorporated by reference herein. In this case, a powder mixture made of at least two materials is used as the starting material. This starting material is melted by means of a high-energy beam to produce the component, wherein the power of the high-energy beam is set depending on the powder mixture used. Corresponding values for setting the power of the high-energy beam are stored in this case in a database for respective powder mixtures.

It would be advantageous to be able to produce components having a particularly high quality in an additive production method. In addition, it would be advantageous to have available a manufacturing device, by means of which components having a particularly high quality can be produced in an additive production method. Furthermore, it would be advantageous to have available a component having a particularly high quality for a turbomachine.

SUMMARY OF THE INVENTION

The present invention provides a method for ascertaining the concentration of at least one material in a powder mixture which is used as a starting material for producing a component, in particular a component of a turbomachine, in an additive production method. The method comprises:
- providing a powder mixture having at least two different materials;
- guiding a high-energy beam generated by a radiation source over a surface of the powder mixture;
- detecting by a detection unit at least one brightness value of at least one subregion of the surface, which is irradiated by the high-energy beam, during irradiation with the high-energy beam;
- ascertaining by an analysis unit the concentration of the at least one material in the powder mixture depending on the detected at least one brightness value and at least one predetermined reference brightness value for a concentration and/or a concentration range of the material.

In one aspect of the method, a local concentration of the at least one material in the powder mixture may be ascertained on the basis of brightness values of respective exposed pixels of the detection unit.

In another aspect, the at least one brightness value may be detected at a predetermined wavelength or at a predetermined wavelength range.

In yet another aspect, respective brightness values in a visible and/or infrared spectral range may be detected by the detection unit.

In a still further aspect of the method, an averaged concentration of the at least one material in the powder mixture may be ascertained by averaging at least two brightness values and a comparison to the at least one predetermined reference brightness value for a concentration and/or a concentration range of the material.

In another aspect, after the high-energy beam is guided further out of the irradiated subregion of the surface, further brightness values of the subregion may furthermore be detected over a predetermined duration by the detection unit.

In another aspect, respective brightness values and/or concentrations may be stored in a database device.

In another aspect, at least one imperfection in the surface of the powder mixture may be ascertained on the basis of brightness values which are characteristic for the imperfection by the analysis unit, and brightness values associated with the ascertained imperfection may not taken into consideration in the calculation of the concentration of the at least one material. For example, in order to ascertain imperfections, a shape and/or a size of a detected brightness range may be compared to a predetermined shape and/or a predetermined size of a reference brightness range and/or exceeding of a predetermined minimum or maximum brightness value of the detected brightness value and/or a difference of respective brightness values between at least two adjacent measurement points to at least one predetermined difference threshold value.

The present invention also provides a method of operating a manufacturing device for the additive production of a component, in particular a component of a turbomachine, wherein a concentration of the at least one material in the powder mixture as a starting material for the additive production of the component is ascertained by the method set forth above (including the various aspects thereof) and a control parameter of the manufacturing device is set by the analysis unit and/or a control or regulating device depending on the ascertained concentration of the at least one material.

The present invention also provides a manufacturing device for the additive production of a component, in particular a component of a turbomachine. The device comprises at least one powder distribution device for providing a powder mixture which comprises at least two different materials as a starting material for the additive production of the component and at least one radiation source by which a high-energy beam, which can be guided over a surface of the powder mixture, can be generated. The manufacturing device further comprises at least one detection unit for detecting at least one brightness value of the surface during the irradiation thereof by the high-energy beam and at least one analysis unit by which the concentration of at least one material in the powder mixture can be calculated depending on the at least one detected brightness value and at least one reference brightness value for a concentration and/or concentration range of the material.

The present invention also provides a component for a turbomachine which has been produced according to the method set forth above and/or the manufacturing device set forth above.

In one aspect, the component may be a component of an aircraft jet engine.

A first aspect of the invention relates to a method for ascertaining a concentration of at least one material in a powder mixture, which is used as a starting material for the production of a component in an additive production method. In particular, the powder is used in this case as a starting material for the production of a component of a turbomachine, wherein particularly high quality demands exist in the case of components of turbomachines.

It is provided according to the invention that a powder mixture having at least two different materials is provided as the starting material for the additive production of the component. A high-energy beam generated by a radiation source is guided over a surface of this powder mixture. The high-energy beam can be, for example, a laser beam, which can also be referred to in short as a laser, or an electron beam. During the irradiation using the high-energy beam, at least one brightness value of at least one subregion of the surface, which is irradiated by means of the high-energy beam, is detected by means of a detection unit. This detection unit can be designed, for example, as a camera and/or as a so-called optical tomograph. In this case, in particular only the respective irradiated subregion is detected. However, it is also possible that brightness values of subregions of the surface are detected which adjoin this subregion. Thus, for example, the brightness of a melting region of the powder mixture and the surface of the powder surrounding this melting region can be detected.

Depending on the detected at least one brightness value or respective detected brightness values and on at least one predetermined reference brightness value for a concentration and/or a concentration range of the material, the concentration of at least one material in the powder mixture is ascertained by means of an analysis unit. It is thus possible to detect and determine the composition of the powder mixture during the additive production, i.e., online. For example, the manufacturing of the component, in particular the composition of the powder mixture used, can be regulated depending on the ascertained concentration values. Furthermore, it can advantageously also be taken into consideration that different concentrations of the materials can result in different degrees of shrinking in the component to be produced. This factor can also be taken into consideration during the manufacturing and corrected if necessary by way of the ascertainment of the concentration of the materials in the powder mixture. It is thus possible overall to produce a component having particularly high quality with respect to material composition and geometry.

In the ascertainment of the concentration of the at least one material, it has been shown that the melt bath of the powder mixture has different brightness values depending on the composition. The materials can comprise, for example, metals, metal alloys, and/or ceramics in this case. For example, a powder can be used in which one material is a metal oxide such as titanium oxide and a second material is a ceramic starting material. It could be ascertained according to the invention that a so-called process radiation of the irradiated powder mixture is brighter the lower the ceramic proportion is in the powder mixture. The so-called process radiation can be, for example, emitted light as a result of the fusing procedure and/or heating of the powder mixture.

By means of the method according to the inventions, deviations of the powder mixture from a standard composition, which result, for example, due to irregularities in a mixing facility of the powder mixture and/or due to contaminants, can be ascertained, in particular online.

The calculation or ascertainment of the concentration of the at least one material can be performed in this case on the basis of tables, for example. For example, respective expected brightness values for various concentrations can be experimentally determined and stored as brightness reference values in the analysis unit and/or saved in table form for a powder mixture made of an aluminum oxide powder such as $Al_2O_3$ and a nickel-based alloy such as IN718. These expected and/or predetermined brightness values can also be experimentally ascertained depending on respective process or control parameters of the manufacturing device and again stored as brightness reference values in the analysis unit and/or saved in table form. Respective intermediate values can be calculated by suitable interpolation and saved. The brightness values can be in particular a function of the power of the high-energy beam and/or its focusing in this case.

In a further advantageous embodiment of the method according to the invention, it is provided that a local concentration of the at least one material in the powder mixture is ascertained on the basis of brightness values of respective exposed pixels of the detection unit. An exposed pixel can correspond in this case to a specific point or a specific delimited subregion in the surface. The concentration of at least one of the materials can thus be determined locally in accordance with the resolution of the detection unit. It is thus possible to determine a concentration distribution of the different materials in the powder mixture exactly. Furthermore, it is again possible to detect irregularities in material concentrations of the powder mixture on a structural surface. For example, a powder mixture can also be provided by the alternating application of two different powders. Locally irregular concentrations can occur in this case, which can be detected by the method according to the invention and considered and/or corrected during the production of the component.

In a further advantageous embodiment of the method according to the invention, it is provided that the at least one brightness value is detected at a predetermined wavelength or in a predetermined wavelength range. Possible interfering variables can therefore advantageously be filtered out during the detection of the brightness values. For example, during the irradiation of the powder mixture using the high-energy beam, a reflection of the high-energy beam can occur, which is not to be taken into consideration when ascertaining the concentration of the at least one material. Because the wavelength of the high-energy beam is typically known, respective reflections of the high-energy beam can thus be calculated out and/or filtered out easily. Furthermore, wavelengths and wavelength ranges can be selected, at or in which relatively high signals or brightness values can be measured. This is used to increase the accuracy of the concentration determinations. The brightness values of multiple materials of the powder mixture can also each be detected at different wavelengths or wavelength ranges. For example, the possibility exists that respective brightness values in the visible and/or infrared spectral range are detected by means of the detection unit. For this purpose, for example, corresponding filters can be provided in front of a sensor of the detection unit. The detection in the visible spectral range can be performed by means of a particularly cost-effective sensor. For example, commercially-available sensors of a CCD camera can be used in this case. For the detection in the infrared spectral range, the respective brightness values can be detected particularly well without interfering variables such as reflections of the high-energy beam. The infrared spectral range is in particular the near infrared spectral range. Due to the irradiation using the high-energy beam and the local fusing, the powder mixture is typically primarily excited to emit infrared radiation and less to emit light in the visible spectral range. In the meaning of this application, infrared radiation values are also to be understood as brightness values in this case. This applies accordingly to the reference brightness values. That is to say, infrared radiation emitted from the surface or the powder mixture can be detected as a brightness value of the surface. For example, a so-called CMOS sensor can be used as a sensor for the detection in the infrared spectral range.

In a further advantageous embodiment of the method according to the invention, it is provided that an averaged concentration of the at least one material in the powder mixture is ascertained via averaging of at least two brightness values and the comparison to the at least one predetermined reference brightness value for a concentration and/or a concentration range of the material. It can therefore be determined reliably whether the provided powder mixture generally has a required composition. In addition, respective interference, which has no influence on the component quality and/or does not correspond to a deviating concentration, can also remain unconsidered in the ascertainment of the concentration by means of averaging. In particular, for this purpose the averaged concentration can be determined according to statistical methods, in which respective extreme values of the concentration are not considered. In this case, corresponding minimum and maximum values of the brightness values can be predetermined as threshold values.

In a further advantageous embodiment of the method according to the invention, it is provided that after the high-energy beam is guided further out of the irradiated subregion of the surface, further brightness values of the subregion are furthermore detected over a predetermined duration by means of the detection unit. In this case, for example, cooling or darkening of the subregion of the surface after the irradiation and fusing using the high-energy beam is detected, wherein different material ratios in the powder mixture have an influence on the cooling behavior and the corresponding light emission. In addition to the determination of the relative ratios of the material concentrations to one another, which can in turn be determined via the comparison of the detected brightness values and/or brightness intervals to corresponding reference brightness values and/or predetermined reference brightness intervals, it is also possible to be able to make statements about the general material ratios in the powder mixture. Thus, for example, a powder mixture having a higher proportion of metals can dissipate heat more rapidly than a powder mixture having a high ceramic proportion. Furthermore, powder compositions can also be differentiated on the basis of different cooling curves, which initially have similar brightness values during the irradiation or fusing.

In a further advantageous embodiment of the method according to the invention, it is provided that respective brightness values and/or concentrations, in particular local concentrations, are stored in a database device. An analysis of the production process after the manufacturing of the component is thus possible. At the same time, the collected data can be used to determine a component quality. The collected data can also be used for comparison during the production of further components. The stored values can also be used in particular as further reference values for further ascertainments of concentrations via corresponding brightness values with other powder mixtures.

In a further advantageous embodiment of the method according to the invention, it is provided that at least one imperfection in the surface of the powder mixture is ascertained on the basis of brightness values characteristic for the imperfection by means of the analysis unit, wherein the brightness values associated with the ascertained imperfection are not taken into consideration in the calculation of the concentration of the at least one material. Respective brightness values of the irradiated or fused regions of the surface can change not only as a result of the concentration of the materials in the powder mixture, but rather also as a result of other factors. So-called imperfections can occur during the production of the component. For example, such imperfections can arise due to a high-energy beam which is incorrectly focused and/or provided with deviating power. Imperfections can also occur as a result of geometric irregularities in the powder. For example, there can be a gap in the powder or a local protrusion. Furthermore, imperfections can arise due to other environmental influences, for example, due to swirling in a protective gas or an uneven composition of the protective gas. Such imperfections typically have an influence on the respective brightness values during the irradiation and fusing of the surface of the powder and are not to be taken into consideration in the ascertainment of the concentrations of the materials. By ascertaining and filtering out imperfections, the concentration can therefore be determined particularly accurately and therefore a component having particularly high quality can also be produced.

In a further advantageous embodiment of the method according to the invention, it is provided that to ascertain imperfections, a shape and/or a size of a detected brightness range is compared to a predetermined shape and/or a predetermined size of a reference brightness range and/or exceeding of a predetermined minimum or maximum brightness value of the detected brightness value and/or a difference of respective brightness values which result between at least two adjacent measurement points to at least one predetermined difference threshold value. The measurement points can correspond in particular to respective pixels of the detection unit. Many imperfections can be identified very reliably on the basis of the nature thereof and/or the above-mentioned criteria. For example, an imperfection which does not correspond to a concentration change of the materials may be concluded from a strong brightness change over a short distance on the surface of the powder mixture and/or in a small region. The strong brightness change over a short distance on the surface can also be referred to as a sharp-edged brightness change. For example, in a powder mixture made of two different powders, an uneven concentration distribution or distribution of the materials can occur as a result of faulty mixing processes. However, this is typically distributed gradually over a larger-area region of the surface of the powder mixture. A sharp-edged brightness change is therefore typically not a result of a faulty mixing process.

A second aspect of the invention relates to a method for operating a manufacturing device for additive production of a component, in particular a component of a turbomachine. It is provided according to the invention in this case that the concentration of the at least one material in the powder mixture as a starting material for the additive production of the component is ascertained by means of the method according to the first aspect of the invention and a control parameter of the manufacturing device is set by means of the analysis unit depending on the ascertained concentration of the at least one material. The features and advantages resulting from the use of the method according to the first aspect of the invention can be inferred from the descriptions of the first aspect of the invention, wherein advantageous embodiments of the first aspect of the invention are to be considered as advantageous embodiments of the second aspect of the invention and vice versa.

It is thus possible to control and/or regulate the manufacturing device and the production method depending on the ascertained concentrations. In particular, a radiation source, a deflection device, a powder distribution device, and/or a powder mixing device can be controlled depending on the ascertained concentrations, in order to be able to counteract the dispensing and/or the melting of a powder mixture having faulty material concentrations and ratios. The component quality can thus advantageously be significantly improved. In addition, a shrinkage in the individual component layers and/or in specific subregions of the component layers, which is dependent on the respective concentrations of the materials, can be taken into consideration in the production of the component. The ascertained concentration of the materials in a layer can also be taken into consideration in the construction of the next layer of the component for the control of the manufacturing device.

A third aspect of the invention relates to a manufacturing device for additive production of a component, in particular a component of a turbomachine, having at least one powder distribution device for providing a powder mixture comprising at least two different materials as a starting material for the additive production of the component, and having at least one radiation source, by means of which a high-energy beam, which can be guided over a surface of the powder mixture, can be generated. It is provided according to the invention in this case that the manufacturing device comprises at least one detection unit for detecting at least one brightness value of the surface of the powder mixture upon the irradiation thereof using the high-energy beam and at least one analysis unit, by means of which a concentration of at least one material in the powder mixture can be calculated depending on the at least one detected brightness value and at least one reference brightness value for a concentration and/or concentration range of the material.

The manufacturing device is thus designed to carry out a method according to the first aspect of the invention and/or to be operated according to a method according to the second aspect of the invention. Respective components, in particular components of a turbomachine, can thus be produced having a particularly high quality. The features and advantages resulting from the use of the method according to the first aspect of the invention or from the use of the method according to the second aspect of the invention can be inferred from the descriptions of the first or the second aspect of the invention, respectively, wherein the advantageous embodiments of the first or the second aspect of the invention are to be considered advantageous embodiments of the third aspect of the invention and vice versa.

A fourth aspect of the invention relates to a component for a turbomachine. According to the invention, this component is produced using a method according to the second aspect of the invention and/or in a manufacturing device according to the third aspect of the invention. A component having a particularly high quality can thus be produced. For example, maintaining a geometry of the component, respective strengths, a density of the component and/or a material homogeneity and/or the surface quality of the component are to be considered to be quality features here. The features and advantages resulting from the use of the method according to the second aspect of the invention or from the use of the manufacturing device according to the third aspect of the invention can be inferred from the descriptions of the second or the third aspect of the invention, respectively, wherein the advantageous embodiments of the second or the third aspect of the invention are to be considered advantageous embodiments of the fourth aspect of the invention and vice versa. The component can be a component of an aircraft jet engine.

Further advantages, features, and details of the invention result from the following description of preferred exemplary embodiments and on the basis of the drawing. The features and feature combinations mentioned above in the description and the features and feature combinations mentioned hereafter in the description of the FIGURE and/or shown solely in the FIGURE is usable not only in the respective specified combination, but rather also in other combinations or alone, without leaving the scope of the invention.

BRIEF DESCRIPTION OF THE DRAWING

The single FIGURE shows a schematic sectional view of a manufacturing device for additive production of a component.

DETAILED DESCRIPTION OF AN EMBODIMENT OF THE INVENTION

The FIGURE shows a schematic sectional view of a manufacturing device 10 for additive production of a component 28, in particular a component of a turbomachine. The manufacturing device 10 comprises at least one powder distribution device 12 in this case for dispensing a powder mixture 14 onto a vertically adjustable construction platform 26. The powder mixture 14 comprises in this case at least two different materials as the starting material for the additive production of the component 28. Furthermore, the manufacturing device 10 comprises a radiation source 16, by means of which a high-energy beam 20, which can be guided over a surface 18 of the powder mixture 14, can be generated. The high-energy beam 20 is focused in this case by means of a focusing unit 22 and guided by means of a deflection device 24 over the surface 18 of the powder mixture 14. Alternatively, for example, the radiation source 16 itself could also be moved to guide the high-energy beam 20. By guiding the high-energy beam 20 over the surface 18 of the powder mixture 14, the component 28 is produced layer by layer by melting and/or sintering the powder mixture 14. A guide vane of a turbomachine, which is already partially produced, is schematically shown as the component 28 in the FIGURE.

The high-energy beam 20 is a laser beam in the illustrated exemplary embodiment. However, electron beams can also be used, for example. The component 28 can be produced, for example, in the so-called selective laser melting method by means of the manufacturing device 10.

In the illustrated exemplary embodiment, the powder mixture 14 comprises two different powdered materials, which are stored in two depots 30 and 32. The materials are supplied to the powder distribution device 12 from the depots 30, 32 and mixed therein. For example, a metallic material such as a nickel-based alloy can be stored in the depot 30 and a ceramic material or a ceramic starting material can be stored in the depot 32. The powder distribution device 12 additionally comprises a scraper 34 for dispensing the powder mixture onto the construction platform 26. Alternatively, the powder mixture 14 can also be supplied already mixed to the powder distribution device 12. Of course, the powder mixture 14 can also be formed from three or more different materials.

In both cases, irregularities can occur during mixing of the materials of the powder mixture 14. For example, the two separate powders or the two materials cannot be mixed uniformly everywhere. Different concentrations of the materials in the powder mixture 14 can thus exist locally in an undesired manner. These deviations from the desired uniform concentration distributions have an influence on the quality of the finished component 28. In particular, the powder mixture 14 can react differently to the irradiation using the high-energy beam 20 at different concentrations of the individual materials. For example, the powder mixture 14 can fuse excessively strongly or not enough in the event of a concentration of the materials which deviates from a predefined and advantageous concentration distribution. The finished component can thus have local inhomogeneities, in particular density variations, locally differing strengths, and/or an unplanned and/or irregular shrinkage. An increased discard rate occurs, because the produced component has a reduced component quality. Costly and complex reworking can also become necessary in this way.

The manufacturing device 10 shown in the FIGURE additionally comprises a detection unit 36 for detecting at least one brightness value of the surface 18 during the irradiation thereof using the high-energy beam 20, and also an analysis unit 38, by means of which a concentration or a concentration range of at least one of the materials in the powder mixture 14 can be calculated depending on the detected respective brightness values and at least one reference brightness value for a concentration and/or a concentration range of the material. The manufacturing device 10 can be controlled depending on this ascertained concentration of the at least one material or the concentrations of some or all materials. For example, the analysis unit 38 can control a power of the radiation source 16 and/or an activation of the deflection device 24 depending on the detected concentrations. Respective irregularities during the mixing of the powder mixture 14 can thus be at least partially compensated for during the additive manufacturing, for example. The concentration of the materials in the powder mixture 14 can thus be monitored and/or regulated in the manufacturing device 10 via a so-called online process control.

The fact that a change of the powder composition or the material concentrations in the powder mixture 14 has a significant effect on process radiation is made use of in this case. Process radiation refers to the generated light or the generated radiation as a result of irradiation, heating, and the occurring fusing of the powder mixture 14 using the high-energy beam 20. Thermal radiation is thus emitted during the heating and/or during the fusing of the powder mixture 14. Vaporization and/or ionization of parts of the powder mixture 14 can occur at the same time. The powder mixture 14 can also at least partially reflect the high-energy beam 20.

The detected brightness values can be read as grayscale values in this case. For example, at a 10% proportion of aluminum oxide in the powder mixture 14, a grayscale value of 15,000 can be measured, and at a 20% proportion of aluminum oxide in the powder mixture 14, a grayscale value of 20,000 results. Ascertaining the concentration of this material within the powder mixture 14 is therefore possible very accurately. Intermediate values can be ascertained by interpolation.

The detection unit 36 can be designed as a so-called optical tomograph, for example. This optical tomograph can detect light in the visible and/or in the near infrared spectral range, for example. In particular, the detection of respective brightness values which are correlated with the concentration of the materials can be limited in this case by suitable filters. For example, respective reflections of the high-energy beam 20 are to be filtered out during the detection. The illustrated manufacturing device 10 additionally comprises a database device or memory device 40, in which respective measured values can be stored for later analysis and/or further comparison. At the same time, respective reference brightness values can be stored in the database device 40. For example, the concentration of a material in the powder mixture 14 can be compared by means of a comparison of the measured brightness values with brightness reference values in a table and/or from values stored during previous manufacturing. These brightness reference values can be saved, for example, for respective different concentrations of different materials and/or different powers and deflection speeds of the high-energy beam 20.

During the processing of so-called multi-material powders, maintaining a defined composition, i.e., a defined and predetermined concentration of the individual components, is of decisive significance for the desired properties of the powder mixture 14 and the quality of the component 28 produced therefrom. The concentrations have to correspond to the set specifications both in the buildup direction and also in the construction plane. These concentrations can be monitored and/or even regulated via a suitable process control. That is to say, the powder distribution device 12 can also be controlled depending on the ascertained concentrations. In this case, the composition of the powder mixture 14 can be set again upon the dispensing of a new powder layer, to be able to compensate for deviations in the previous component layer, for example. Optical tomography can be used in this case as a monitoring method.

LIST OF REFERENCE NUMERALS 10 manufacturing device
12 powder distribution device
14 powder mixture
16 radiation source
18 surface
20 high-energy beam
22 focusing unit
24 deflection device
26 construction platform
28 component
30 depot
32 depot
34 scraper
36 detection unit
38 analysis unit
40 database device

What is claimed is:

1. A method for ascertaining a concentration of at least one material in a powder mixture used as a starting material for producing a component in an additive production method, wherein the method comprises:
   providing a powder mixture comprising at least two different materials selected from one or more of metals, metal alloys, metal oxides and ceramic materials;
   guiding a high-energy beam generated by a radiation source over a surface of the powder mixture;
   detecting by a detection unit at least one brightness value of radiation in a visible and/or infrared spectral range emerging from at least one subregion of the surface, which is irradiated by the high-energy beam, during irradiation with the high-energy beam;
   ascertaining the concentration of the at least one material in the powder mixture based on the detected at least one brightness value and at least one predetermined reference brightness value for a concentration and/or a concentration range of the material.

2. The method of claim 1, wherein a local concentration of the at least one material in the powder mixture is ascertained on the basis of brightness values of respective exposed pixels of the detection unit.

3. The method of claim 1, wherein respective brightness values of radiation in at least the infrared spectral range are detected by the detection unit.

4. The method of claim 3, wherein a CMOS sensor is used as a sensor for detection of the brightness value.

5. The method of claim 1, wherein an averaged concentration of the at least one material in the powder mixture is ascertained by averaging at least two brightness values and a comparison to the at least one predetermined reference brightness value for a concentration and/or a concentration range of the material.

6. A method of operating a manufacturing device for additive production of a component, wherein a concentration of the at least one material in the powder mixture as a starting material for the additive production of the component is ascertained by the method of claim 5 and a control parameter of the manufacturing device is set depending on the ascertained concentration of the at least one material.

7. The method of claim 1, wherein after the high-energy beam is guided further out of the irradiated subregion of the surface, further brightness values of the subregion are furthermore detected over a predetermined duration by the detection unit.

8. The method of claim 1, wherein respective brightness values and/or concentrations are stored in a database.

9. The method of claim 1, wherein at least one imperfection in the surface of the powder mixture is ascertained on the basis of brightness values characteristic for the imperfection, and brightness values associated with the ascertained imperfection are not taken into consideration in a calculation of the concentration of the at least one material.

10. The method of claim 9, wherein, to ascertain imperfections, a shape and/or a size of a detected brightness range is compared to a predetermined shape and/or a predetermined size of a reference brightness range and/or exceeding of a predetermined minimum or maximum brightness value of the detected brightness value and/or a difference of respective brightness values between at least two adjacent measurement points to at least one predetermined difference threshold value.

11. The method of claim 1, wherein the component is a component of a turbomachine.

12. A method of operating a manufacturing device for additive production of a component, wherein a concentration of the at least one material in the powder mixture as a starting material for the additive production of the component is ascertained by the method of claim 1 and a control parameter of the manufacturing device is set depending on the ascertained concentration of the at least one material.

13. The method of claim 1, wherein the powder mixture comprises at least one ceramic material.

14. The method of claim 13, wherein the powder mixture comprises at least one metal alloy.

15. The method of claim 1, wherein the powder mixture comprises at least one metal alloy.

16. The method of claim 1, wherein detected brightness values are read as grayscale values.

17. The method of claim 1, wherein the detection unit is an optical tomograph.

18. A method for ascertaining a concentration of at least one material in a powder mixture used as a starting material for producing a component of a turbomachine in an additive production method, wherein the method comprises:
   providing a powder mixture comprising at least two different materials selected from one or more of metals, metal alloys, metal oxides and ceramic materials and comprising at least one ceramic material;
   guiding a high-energy beam generated by a radiation source over a surface of the powder mixture;
   detecting by a detection unit at least one brightness value of radiation in at least an infrared spectral range emerging from at least one subregion of the surface, which is irradiated by the high-energy beam, during irradiation with the high-energy beam;
   ascertaining the concentration of the at least one material in the powder mixture based on the detected at least one brightness value and at least one predetermined reference brightness value for a concentration and/or a concentration range of the material.

19. The method of claim 18, wherein an averaged concentration of the at least one material in the powder mixture is ascertained by averaging at least two brightness values and a comparison to the at least one predetermined reference brightness value for a concentration and/or a concentration range of the material.

20. The method of claim 18, wherein at least one imperfection in the surface of the powder mixture is ascertained on the basis of brightness values characteristic for the imperfection, and brightness values associated with the ascertained imperfection are not taken into consideration in a calculation of the concentration of the at least one material.

* * * * *